United States Patent
Berube

(10) Patent No.: US 10,514,069 B2
(45) Date of Patent: Dec. 24, 2019

(54) DUAL RATE TORSIONAL STIFFNESS DRIVE SHAFT ASSEMBLY

(71) Applicant: Steering Solutions IP Holding Corporation, Saginaw, MI (US)

(72) Inventor: Matthew A. Berube, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 277 days.

(21) Appl. No.: 15/478,644

(22) Filed: Apr. 4, 2017

(65) Prior Publication Data

US 2018/0283463 A1    Oct. 4, 2018

(51) Int. Cl.
*F16D 3/12*    (2006.01)

(52) U.S. Cl.
CPC ............. *F16D 3/12* (2013.01); *Y10S 464/906* (2013.01)

(58) Field of Classification Search
CPC ......... F16D 3/12; F16D 3/221; Y10S 464/906
USPC .................................... 464/81, 141
See application file for complete search history.

(56) References Cited

U.S. PATENT DOCUMENTS

| | | | | |
|---|---|---|---|---|
| 1,112,869 A * | 10/1914 | Tirrell | ...................... | F16D 3/221 |
| 1,763,206 A * | 6/1930 | Woveris | .................. | F16D 3/221 |
| | | | | 464/141 |
| 4,768,993 A * | 9/1988 | Axelsson | .................. | F16D 3/58 |
| 7,621,815 B2 * | 11/2009 | Bosserdet, Jr. | .......... | F16D 7/048 |
| 8,323,116 B2 * | 12/2012 | Flores-Garay | .......... | F16D 3/221 |
| | | | | 464/141 |

FOREIGN PATENT DOCUMENTS

| | | | | |
|---|---|---|---|---|
| GB | 19235 | * | 9/1899 | ..................... 464/141 |
| SU | 1328019 A1 | * | 8/1987 | ..................... 464/141 |

* cited by examiner

*Primary Examiner* — Greg Binda

(57) ABSTRACT

A drive shaft assembly includes a first shaft member, a second shaft member, and a ball member. The first shaft member has a base that radially extends from a first shaft that extends along a first axis, and a finger that extends from the base and defines a first ball track. The second shaft member has a second shaft extending along a second axis defining a second ball track. The ball member is received within the first ball track and the second ball track.

7 Claims, 4 Drawing Sheets

DUAL RATE TORSIONAL STIFFNESS DRIVE SHAFT ASSEMBLY

BACKGROUND

Vehicle drive lines transmit torque or power from a drive source, such as an internal combustion engine, to vehicle wheels. The torque or power may be transmitted through a series of driveline components such as gears, joints, and shafts. The driveline components provide a level of torsional stiffness to satisfy performance requirements. The driveline components also provide a level of compliance to reduce unwanted noise, vibration, or harshness. Some vehicle drive lines include drive shafts that are a simple one-piece torque transmitting shaft having a single torsional stiffness rate.

Accordingly, it is desirable to provide a torque transmitting shaft having more than a single torsional stiffness rate.

SUMMARY

According to an embodiment of the present disclosure, a drive shaft assembly is provided. The drive shaft assembly includes a first shaft member and a second shaft member. The first shaft member has a first shaft extending along a first axis, a base that radially extends from the first shaft, and a finger that axially extends from the base. The finger has a finger end surface that radially extends between a first finger surface and a second finger surface disposed opposite the first finger surface. The second shaft member has a second shaft with an exterior surface that extends about a second axis between a second shaft first end and a second shaft second end. The finger extends over the second shaft second end.

According to another embodiment of the present disclosure, a drive shaft assembly is provided. The drive shaft assembly includes a first shaft member, a second shaft member, and a ball member. The first shaft member has a first shaft extending along a first axis, a base that radially extends from the first shaft, the base defining a first mounting feature that extends along the first axis, and a finger that axially extends from the base and is radially spaced apart from the first mounting feature. The second shaft member has a second shaft that extends along a second axis between a second shaft first end and a second shaft second end. The second shaft second end having a second shaft end face defining a second mounting feature that engages the first mounting feature. The ball member disposed between the finger and the second shaft second end.

According to yet another embodiment of the present disclosure, a drive shaft assembly is provided. The drive shaft assembly includes a first shaft member, a second shaft member, and a ball member. The first shaft member has a base that radially extends from a first shaft that extends along a first axis, and a finger that extends from the base and defines a first ball track. The second shaft member has a second shaft extending along a second axis defining a second ball track. The ball member is received within the first ball track and the second ball track.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
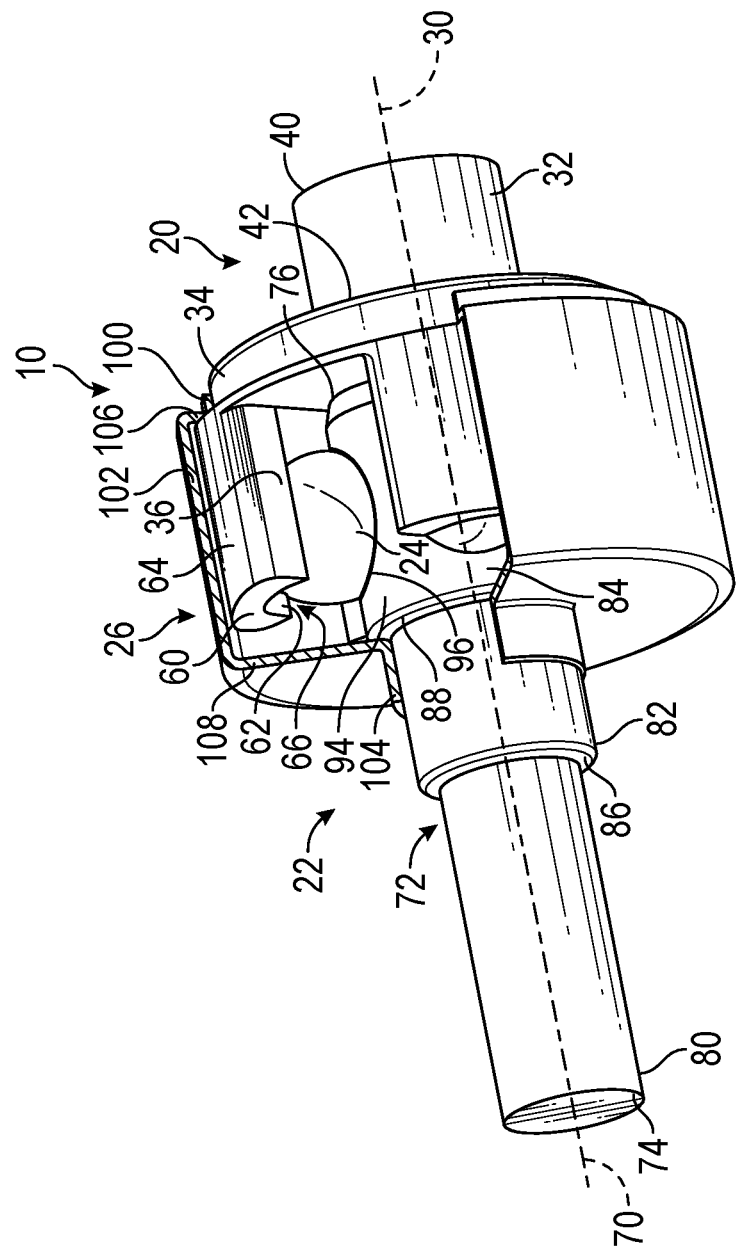
FIG. 1 is a perspective view of a drive shaft assembly.
Figure 2:
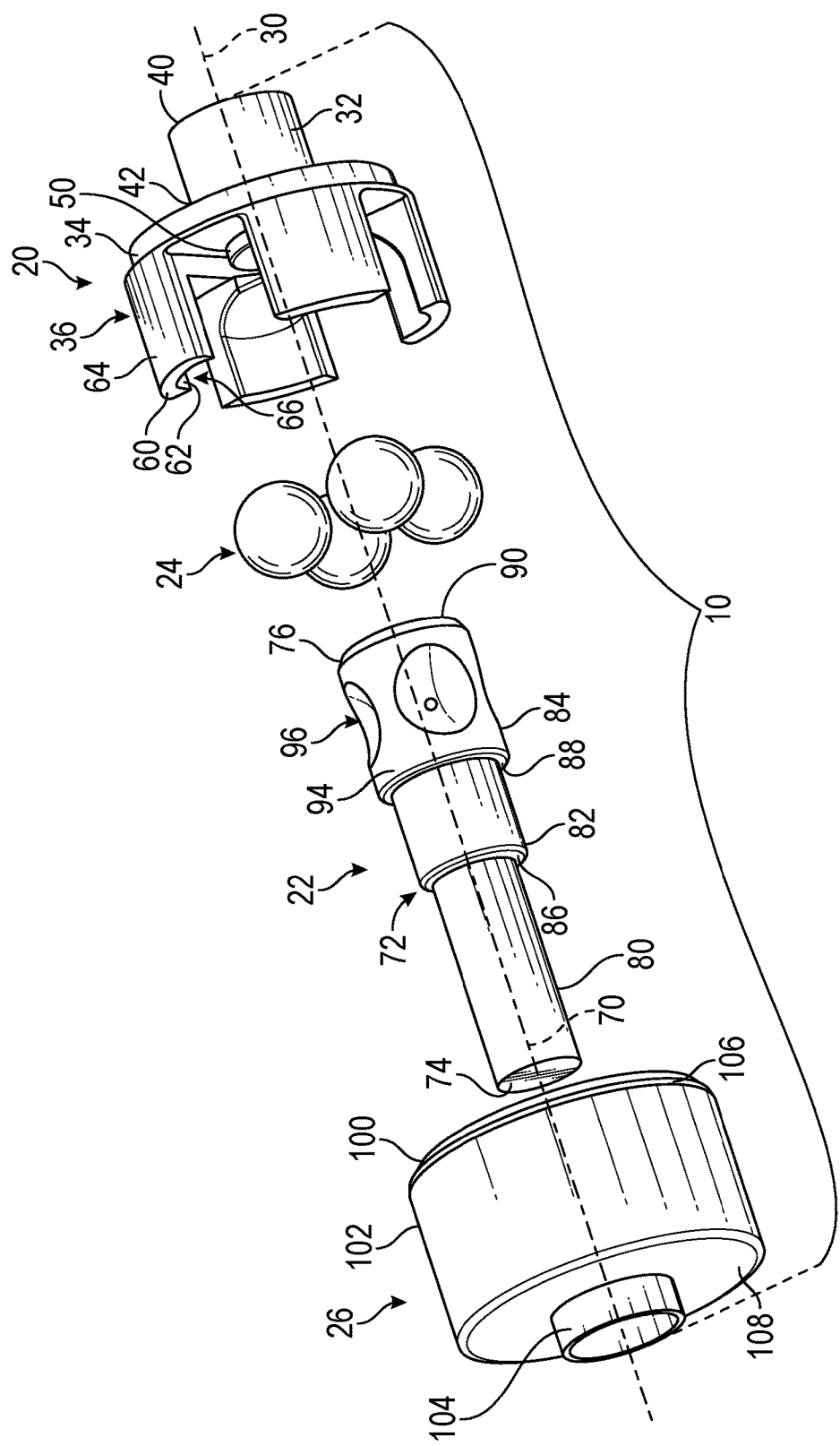
FIG. 2 is a disassembled view of the drive shaft assembly of FIG. 1.
Figure 3:
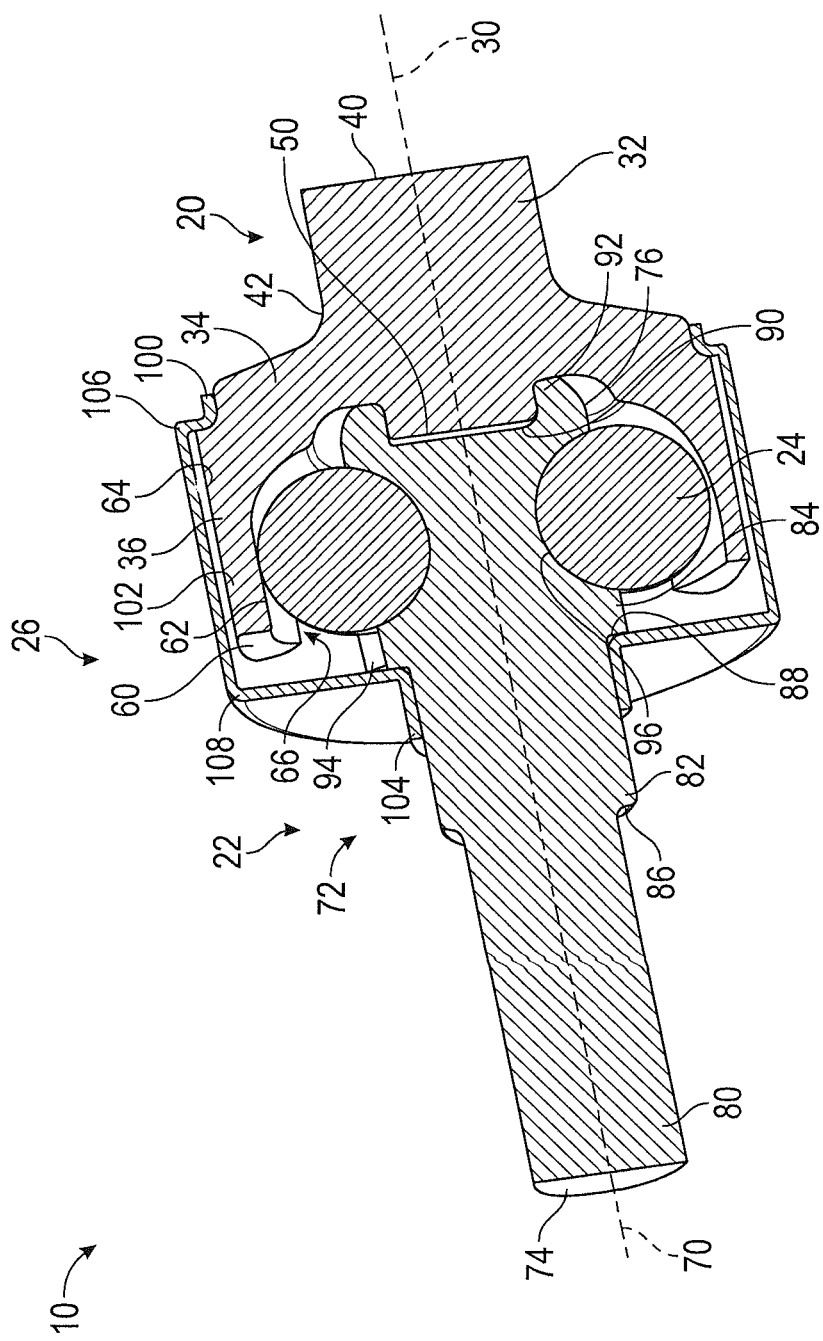
FIG. 3 is a cross-sectional view of the drive shaft assembly of FIG. 1 providing a first torsional stiffness.

Torque transmitting shaft assemblies are used to transmit torque or power from a transmission, transaxle, or the like to a vehicle wheel. The torsional stiffness of the torque transmitting shaft assemblies may affect noise vibration and harshness of driveline systems. It is desirable to provide a torque transmitting shaft assemblies that have differing torsional stiffness constants under different load conditions to improve the noise vibration and harshness of the driveline systems. Referring to FIGS. 1-3, a drive shaft assembly 10 that may be capable of providing a first torsional stiffness below a first load and a second torsional stiffness above the first load or above a second load are shown. The drive shaft assembly 10 includes a first shaft member 20, a second shaft member 22, a ball member 24, and an outer member 26.

The first shaft member 20 extends along a first axis 30. The first shaft member 20 includes a first shaft 32, a base 34, and a finger 36. The first shaft 32 extends axially along the first axis 30 between a first shaft first end 40 and a first shaft second end 42. Wherein the axial direction is a direction that is disposed substantially parallel to the first axis 30. The first shaft 32 is configured as a generally cylindrical driven shaft.

The base 34 is disposed at the first shaft second end 42. The base 34 radially extends from the first shaft second end 42, wherein the radial direction is a direction that is disposed transverse to or perpendicular to the first axis 30. The base 34 defines a first mounting feature 50 that extends along or about the first axis 30, as shown in FIGS. 2 and 3. The first mounting feature 50 is configured as a protrusion, a tab, or a recess that extends into the base 34.

The finger 36 axially extends from the base 34 and is radially spaced apart from the first axis 30. The finger 36 is radially spaced apart from the first mounting feature 50. In at least one embodiment, a plurality of fingers extend from the base 34 and are spaced apart from the first axis 30 and are disposed about the first mounting feature 50.

The finger 36 has a finger end surface 60, a first finger surface 62, and a second finger surface 64. The finger end surface 60 is axially spaced apart from and is disposed substantially parallel to the base 34. The finger end surface 60 radially extends between the first finger surface 62 and the second finger surface 64 that is disposed opposite the first finger surface 62. The first finger surface 62 faces towards the first axis 30. The second finger surface 64 faces away from the first axis 30.

The finger 36 defines a first ball track 66 that extends radially from the first finger surface 62 towards the second finger surface 64 and extends axially from the finger end surface 60 towards the base 34. The first ball track 66 is defined by the first finger surface 62 and extends towards the second finger surface 64.

In at least one embodiment, the finger 36 has a generally arcuate shape such that distal ends of each of the first finger surface 62 and the second finger surface 64 curve towards the first axis 30. The arcuate shape of the first finger surface 62 at least partially defines the first ball track 66.

The second shaft member 22 extends along a second axis 70 between a second shaft first end 74 and a second shaft second end 76. The second axis 70 being disposed substantially coaxial with the first axis 30. The second shaft member 22 is at least partially received within the first shaft member 20 such that the finger 36 extends over the second shaft second end 76 of the second shaft member 22. The second shaft member 22 is rotatable relative to the first shaft member 20. The second shaft second end 76 is disposed proximate the first shaft second end 42. In at least one embodiment the second shaft second end 76 engages the first shaft second end 42.

The second shaft 72 includes a second shaft first portion 80, a second shaft second portion 82, and the second shaft third portion 84. The second shaft first portion 80 axially extends from the second shaft first end 74 towards the second shaft second portion 82. The second shaft first portion 80 has a first diameter. The second shaft second portion 82 axially extends from the second shaft first portion 80 towards the second shaft third portion 84. The second shaft second portion 82 includes a first step surface 86 that radially extends from an outer surface of the second shaft first portion 80 towards an outer surface of the second shaft second portion 82. The second shaft second portion 82 has a second diameter that is greater than the first diameter. The second shaft third portion 84 axially extends from the second shaft second portion 82 towards the second shaft second end 76.

The second shaft third portion 84 includes a second step surface 88 that radially extends from an outer surface of the second shaft second portion 82 towards an outer surface of the second shaft third portion 84. The second shaft third portion 84 also includes a second shaft end face 90 that is disposed at or proximate the second shaft second end 76. The second shaft end face 90 defines a second mounting feature 92 that extends along the second axis 70 and engages the first mounting feature 50. The second mounting feature 92 may be configured as a pair of prongs, a pair of protrusions, or a recess that extends into the second shaft end face 90. The second mounting feature 92 is arranged to receive the first mounting feature 50. In at least one embodiment, the first mounting feature 50 is arranged to receive the second mounting feature 92.

Figure 4:
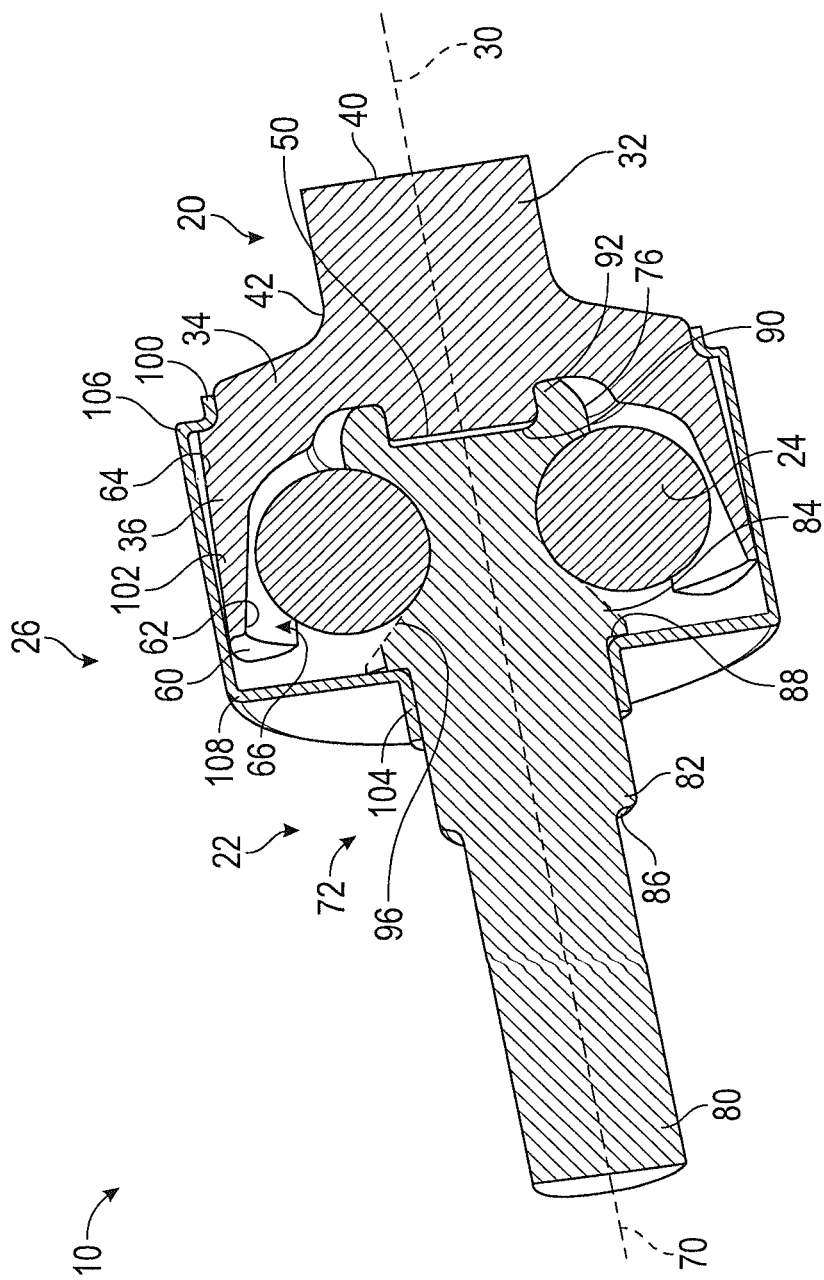
FIG. 4 is a cross-sectional view of the drive shaft assembly of FIG. 1 providing a second torsional stiffness.

The second shaft third portion 84 includes an exterior surface 94 that axially extends between the second step surface 88 and the second shaft end face 90 along the second axis 70. In other words, the exterior surface 94 axially extends between the second shaft first end 74 and the second shaft second and 76. The exterior surface 94 is an outer surface of the second shaft third portion 84 and faces towards the first finger surface 62 of the finger 36. The exterior surface 94 of the second shaft 72 defines a second ball track 96. The second ball track 96 is disposed proximate the second shaft second end 76 and extends radially from the exterior surface 94 towards the second axis 70. The second ball track 96 becomes progressively closer to the first finger surface 62 in a direction that extends from the second shaft second end 76 towards the second shaft first end 74, as shown in FIG. 4.

The ball member 24 is disposed between the finger 36 and the second shaft third portion 84 proximate the second shaft second end 76. The ball member 24 is at least partially received within the first ball track 66 and the second ball track 96. The ball member 24 may be a spherical ball, a rolling element, or the like. The ball member 24 rides along at least one of the first ball track 66 and the second ball track 96 in response to a torque that is applied to at least one of the first shaft member 20 and the second shaft member 22.

The outer member 26 is disposed about the finger 36, the ball member 24, and the second shaft third portion 84 proximate the second shaft second end 76. The outer member 26 is arranged to retain the ball member 24 between the finger 36 and the second shaft third portion 84. The outer member 26 is operatively connected to the first shaft member 20 and the second shaft member 22. More specifically, the outer member 26 left to be connected to the base 34 of the first shaft member 20 and the second shaft second portion 82 of the second shaft member 22.

The outer member 26 includes a first outer member portion 100, a second outer member portion 102, and a third outer member portion 104. The first outer member portion 100 is disposed about and is operatively connected to the base 34. The second outer member portion 102 axially extends from the first outer member portion 100 towards the third outer member portion 104. The second outer member portion 102 is disposed about the finger 36, the ball member 24, and the second shaft third portion 84 of the second shaft 72. The second outer member portion 102 includes a first radial surface 106 and the second radial surface 108. The first radial surface 106 radially extends from the first outer member portion 100 to the second outer member portion 102. The second radial surface 108 radially extends from the second outer member portion 102 to the third outer member portion 104. The third outer member portion 104 axially extends from the second outer member portion 102 towards the second shaft first end 74. The third outer member portion 104 is disposed about and is operatively connected to the second shaft second portion 82 of the second shaft 72.

A first torsional stiffness rate is provided by at least one of the first shaft member 20 and the second shaft member 22 while a first torque is applied to the first shaft member 20 and while there is a tangential clearance or a radial clearance between the second finger surface 64 and an interior surface of the second outer member portion 102 of the outer member 26, as shown in FIGS. 1 and 3.

A second torsional stiffness rate is provided by at least one of the first shaft member 20 and the second shaft member 22 while a second torque is applied to the first shaft member 20 and while there is no tangential clearance or no radial clearance between a portion of the second finger surface 64 and an interior surface of the second outer member portion 102 of the outer member 26, as shown in FIG. 4. The second torque is greater than the first torque.

The increase in the application of torque between the first shaft member 20 and the second shaft member 22 causes the ball member 24 to be driven radially outward by the differential rotational position between the first shaft member 20 and the second shaft member 22. The ball member 24 rides along a portion of at least one of the first ball track 66 of the finger 36 and the second ball track 96 of the second shaft 72 to deflect the finger 36 towards the outer member 26, as shown in FIG. 4.

In at least one embodiment, the ball member 24 is fixedly attached to the second shaft member 22 or the second shaft member 22 is provided with an integrally formed protrusion or protuberance that extends radially outwardly from an exterior surface of the second shaft member 22. The protrusion or protuberance extends towards and may engage the first finger surface 62. The increase in the application of torque between the first shaft member 20 and the second shaft member 22 causes the second shaft member 22 and the protrusion or protuberance to move together such that the protrusion or protuberance slides along the first ball track 66 of the finger 36 to deflect the finger 36 towards the outer member 26.

The engagement between the second finger surface 64 and the interior surface of the second outer member portion 102 of the outer member 26 increases the torsional stiffness rate of the drive shaft assembly 10 to the second torsional stiffness rate that is greater than the first torsional stiffness rate. The changing of the radial deflection or shape of the finger 36 of the first shaft member 20 due to the outward radial motion of the ball member 24 and the contact between the finger 36 and the outer member 26 leads to a nonlinear relationship between the applied torque to the first shaft member 20 and the torsional displacement of the drive shaft assembly 10 improves noise vibration and harshness of the driveline assembly that incorporates the drive shaft assembly 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A drive shaft assembly comprising:
    a first shaft member comprising:
        a first shaft extending along a first axis,
        a base that radially extends from the first shaft, and
        a plurality of fingers circumferentially spaced from each other, each of the fingers axially extending from the base and having a finger end surface that radially extends between a first finger surface and a second finger surface disposed opposite the first finger surface;
    a second shaft member having a second shaft having an exterior surface that extends about a second axis between a second shaft first end and a second shaft second end, each of the fingers extending over the second shaft second end, wherein each of the fingers defines a first ball track that extends radially from the first finger surface towards the second finger surface and that extends axially from the finger end surface towards the base, wherein the second shaft defines a second ball track that is disposed proximate the second shaft second end and that extends radially from the exterior surface towards the second axis;
    a ball member that is received within one of the first ball tracks and the second ball track; and
    an outer member disposed about the plurality of fingers, the ball member, and the second shaft second end, wherein a first torsional stiffness rate is provided by at least one of the first shaft member and the second shaft member while a first torque is applied between the first shaft member and the second shaft member and while there is a radial clearance between the second finger surface and the outer member.

2. The drive shaft assembly of claim 1, wherein the outer member is operatively connected to the first shaft member and the second shaft member.

3. The drive shaft assembly of claim 1, wherein a second torsional stiffness rate is provided by at least one of the first shaft member and the second shaft member while a second torque is applied between the first shaft member and the second shaft member and the ball member deflects at least one of the fingers such that there is no radial clearance between a portion of the second finger surface and the outer member.

4. A drive shaft assembly comprising:
    a first shaft member comprising:
        a first shaft extending along a first axis,
        a base that radially extends from the first shaft, the base defining a first mounting feature that extends along the first axis, and
        a finger that axially extends from the base and is radially spaced apart from the first mounting feature;
    a second shaft member having a second shaft that extends along a second axis between a second shaft first end and a second shaft second end, the second shaft second end having a second shaft end face defining a second mounting feature that engages the first mounting feature; and
    a ball member disposed between the finger and the second shaft second end, wherein the finger has a finger end surface that radially extends between a first finger surface that receives the ball member and a second finger surface disposed opposite the first finger surface, wherein the second shaft defines a second ball track that is disposed proximate the second shaft second end and receives the ball member, wherein the second ball track becomes progressively closer to the first finger surface in a direction that extends from the second shaft second end towards the second shaft first end.

5. The drive shaft assembly of claim 4, wherein the first axis is disposed coaxial with the second axis.

6. The drive shaft assembly of claim 4, further comprising an outer member that is disposed about the finger, the ball member, and the second shaft second end and is operatively connected to the base and the second shaft.

7. A drive shaft assembly comprising:
    a first shaft member having a base that radially extends from a first shaft that extends along a first axis, and a finger that extends from the base and defines a first ball track;
    a second shaft member having a second shaft extending along a second axis defining a second ball track;
    a ball member that is received within the first ball track and the second ball track;
    an outer member comprising:
        a first outer member portion that is disposed about and is operatively connected to the base;
        a second outer member portion extending from the first outer member portion and disposed about the finger, the ball member, and the second shaft; and a third outer member portion extending from the second outer member portion and is disposed about and is operatively connected to the second shaft;

wherein the finger includes a first finger surface that faces towards the ball member and a second finger surface that faces towards the second outer member portion, the first ball track is at least partially defined by the first finger surface, wherein a first torsional stiffness rate is provided by at least one of the first shaft member and the second shaft member while a first torque is applied to the first shaft member and while there is a radial clearance between the second finger surface and the second outer member portion and wherein a second torsional stiffness rate is provided by at least one of the first shaft member and the second shaft member while a second torque is applied to the first shaft member and the ball member rides along the first ball track and deflects the finger such that there is no radial clearance between the second finger surface and the second outer member portion.

* * * * *